US012631282B2

(12) United States Patent
Harada et al.

(10) Patent No.: US 12,631,282 B2
(45) Date of Patent: May 19, 2026

(54) PIPING PLUG, AND TANK VALVE DEVICE INCLUDING SAME

(71) Applicant: KAWASAKI JUKOGYO KABUSHIKI KAISHA, Kobe (JP)

(72) Inventors: Masashi Harada, Kobe (JP); Makoto Ninomiya, Kobe (JP); Masayoshi Okamoto, Kobe (JP); Tomoya Hayase, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 18/726,781

(22) PCT Filed: Oct. 18, 2022

(86) PCT No.: PCT/JP2022/038808
§ 371 (c)(1),
(2) Date: Jul. 3, 2024

(87) PCT Pub. No.: WO2023/135882
PCT Pub. Date: Jul. 20, 2023

(65) Prior Publication Data
US 2025/0067344 A1 Feb. 27, 2025

(30) Foreign Application Priority Data
Jan. 11, 2022 (JP) ................................. 2022-002070

(51) Int. Cl.
*F16L 55/24* (2006.01)
*F17C 13/04* (2006.01)

(52) U.S. Cl.
CPC .............. *F16L 55/24* (2013.01); *F17C 13/04* (2013.01); *F17C 2205/0323* (2013.01); *F17C 2205/0341* (2013.01); *F17C 2221/012* (2013.01)

(58) Field of Classification Search
CPC .......... F16K 1/301; F16K 1/308; F17C 13/04; F17C 2205/0323; F17C 2205/0341; F17C 2221/012; F16L 55/24
See application file for complete search history.

(56) References Cited

U.S. PATENT DOCUMENTS

2010/0206403 A1 * 8/2010 Kuroyanagi ............ F16K 1/308
137/511

FOREIGN PATENT DOCUMENTS

| DE | 202007010788 U1 * | 9/2008 | .......... F16K 15/026 |
|----|----|----|----|
| DE | 102015118843 A1 * | 5/2016 | ............ B01D 35/04 |
| EP | 3006791 A1 * | 4/2016 | .......... F16K 15/025 |
| EP | 3015756 A1 * | 5/2016 | ............ F17C 13/04 |
| JP | 2010265998 A | 11/2010 | |
| JP | 2013029161 A | 2/2013 | |

(Continued)

*Primary Examiner* — Marina A Tietjen
(74) *Attorney, Agent, or Firm* — Alleman Hall LLP

(57) ABSTRACT

A piping plug includes a housing including a through-hole, and a filter device that is inserted into the through-hole and provided in the housing, the filter device includes a holder including a holder passage having a first opening and a second opening, and a filter provided in the holder so as to cover the first opening, the first opening is located on an outer circumferential face of the holder, the second opening is located at one end of the holder, and the holder is cantilever-supported by the housing in one end side part of the holder such that a clearance is left around the outer circumferential face.

8 Claims, 4 Drawing Sheets

(56)          References Cited

FOREIGN PATENT DOCUMENTS

JP          5772350  B2  *   9/2015
WO     WO-2014163131  A1  *  10/2014   ..........  F16K 15/025
WO          2019176249  A1     9/2019

* cited by examiner

PIPING PLUG, AND TANK VALVE DEVICE INCLUDING SAME

TECHNICAL FIELD

The present invention relates to a piping plug including a filter, and a tank vale device including the same.

BACKGROUND ART

As one example of a piping plug, for example, a joint as in PTL 1 is known. In the joint, a filter is located in a through-hole of the joint body. In the joint, gas flows from one opening of the through-path toward the other opening through the filter.

CITATION LIST

Patent Literature

PTL 1: Japanese Laid-Open Patent Application Publication No. 2013-29161

SUMMARY OF INVENTION

Technical Problem

In a joint of PTL 1, a support member and a valve chamber forming member are fitted to a through hole of a joint body separately from each other in the axial direction. A filter intervenes between the support member and the valve chamber forming member. Furthermore, a plurality of slits are formed on the outer circumferential face of the valve chamber forming member. Therefore, in the joint, gas is guided radially outwardly of the filter from one opening of a through-path through a plurality of slits. Further, after passing through the filter, the gas flows to the other opening of the through-path through inside the filter and inside the support member. In the joint configured in this manner, the gas passes through a plurality of slits. Therefore, the pressure loss of the gas flowing through the joint is large.

In light of the above, it is an object of the present invention to provide a piping plug capable of reducing pressure loss of the flowing fluid, and a tank valve device including the piping plug.

Solution to Problem

A piping plug of the present invention includes: a housing including a through-hole, and a filter device that is inserted into the through-hole and provided in the housing, and the filter device includes a holder including a holder passage having a first opening and a second opening, and a filter provided in the holder so as to cover the first opening, and the first opening is located on an outer circumferential face of the holder, the second opening is located at one end of the holder, and the holder is cantilever-supported by the housing in one end side part of the holder such that a clearance is left around the outer circumferential face.

According to the present invention, the clearance around the outer circumferential face of the holder connects to the holder passage via the filter and the first opening. Therefore, it is possible to make the filter intervene in the through-hole. Further, since the holder is cantilever-supported by the housing in one end side part, it is possible to make the clearance annular. Accordingly, it is possible to increase the flow passage area of the clearance compared with the case where the holder is supported on both ends, and hence, it is possible to reduce the pressure loss of the fluid flowing through the through-hole.

The tank valve device of the present invention includes a casing provided in a tank, and the piping plug described above, and the piping plug is attached to the casing.

According to the present invention, it is possible to provide a tank valve device having the function as described above.

Advantageous Effects of Invention

According to the present invention, it is possible to reduce the pressure loss of the flowing fluid.

The above objects, other objects, features, and merits of the present invention will be apparent from the detailed description of the following preferred embodiments by reference to attached drawings.

DESCRIPTION OF EMBODIMENTS

Hereinafter, a tank valve device 1 and a piping plug 2 embodying the present invention are described by referring to the aforementioned drawings. The concept of the direction used in the following description is merely used for convenience in description, and should not be understood to limit the orientation or the like of the configuration of the invention to the described direction. The tank valve device 1 and the piping plug 2 described below each are merely one embodiment of the present invention. Therefore, the present invention is not limited to the embodiments, but addition, deletion, and modification can be made without departing from the scope of the invention. It is to be noted that the present invention is not limited to the embodiments, but addition, deletion, and modification can be made without departing from the scope of the invention.

Tank Valve Device

The tank valve device 1 includes a valve block 3, and the piping plug 2. The tank valve device 1 is provided in a tank (not shown) that stores fluid. The fluid is, for example, gas. In the present embodiment, the gas is hydrogen gas. It is to be noted that the gas is not limited to hydrogen, but may be other gas such as helium, nitrogen and natural gas, or may be liquid. The tank valve device 1 seals the tank by sealing an opening of the tank. Also, the tank valve device 1 controls the flow of gas delivered from the tank by means of various valves. Examples of the various valves include an electromagnetic valve and a manual valve. Furthermore, the tank valve device 1 is capable of filling the tank with gas.

Valve Block

Figure 2:
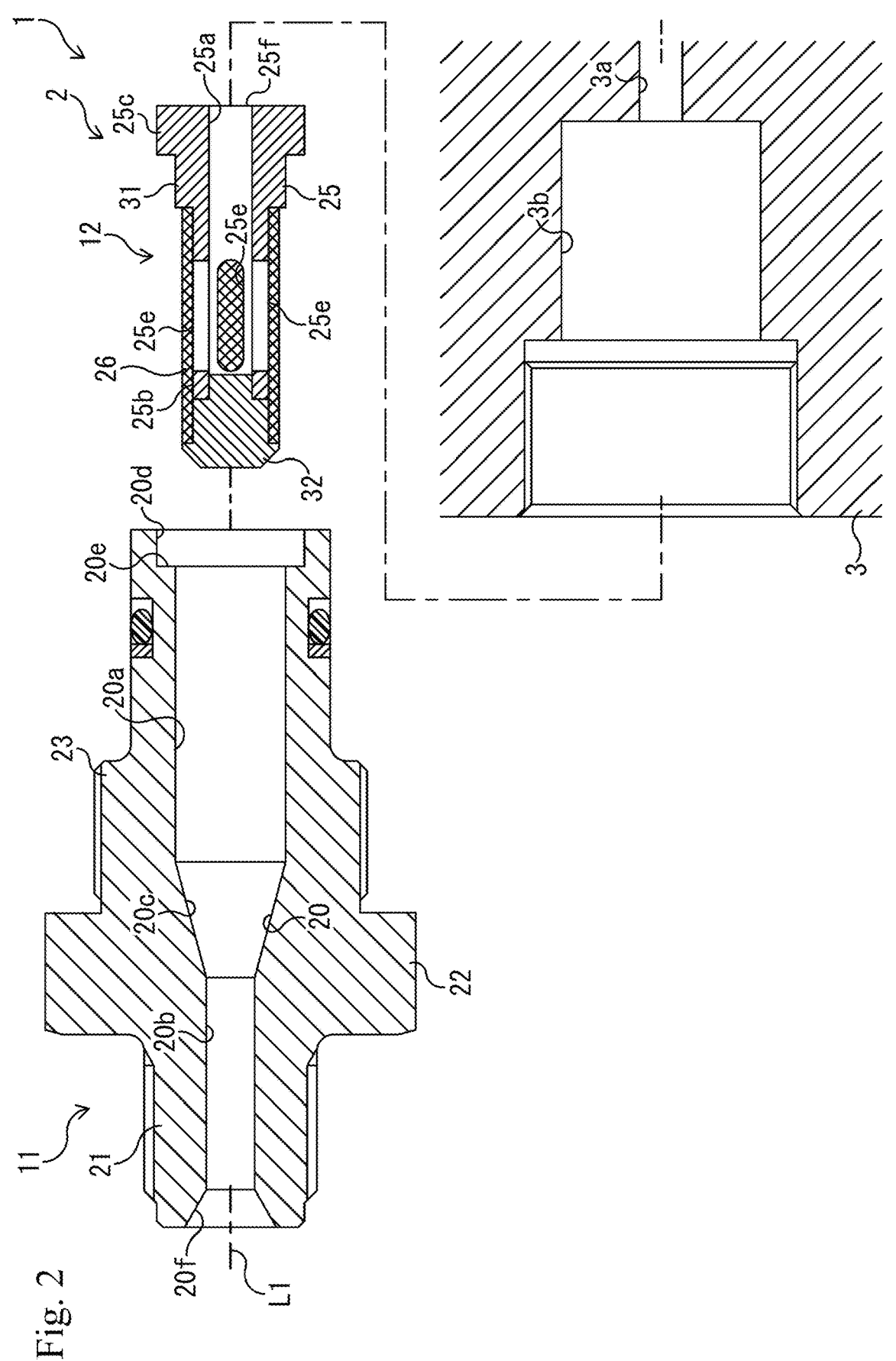
FIG. 2 is an enlarged cross-sectional view showing the piping plug of FIG. 1 in exploded state.

The valve block 3 which is one example of casing is provided in the tank. More specifically, the valve block 3 is inserted through the opening of the tank. Thus, the valve block 3 seals the opening of the tank. The valve block 3 has a passage 3a and an attachment hole 3b as also shown in FIG. 2. The passage 3a is a passage through which gas to be filled and supplied flows. One end of the passage 3a connects to inside the tank. The attachment hole 3b is a bottomed hole formed along a predetermined axial line L1. On the bottom surface of the attachment hole 3b, the other end of the passage 3a opens. And, the opening of the passage 3a is formed in the bottom surface of the attachment hole 3b such that the center of the opening is located on the axial line L1. Also, the valve block 3 is provided with the aforementioned various valves. The various valves are interposed in the passage 3a. The various valves control the flow of gas delivered from the tank.

Piping Plug

Figure 1:
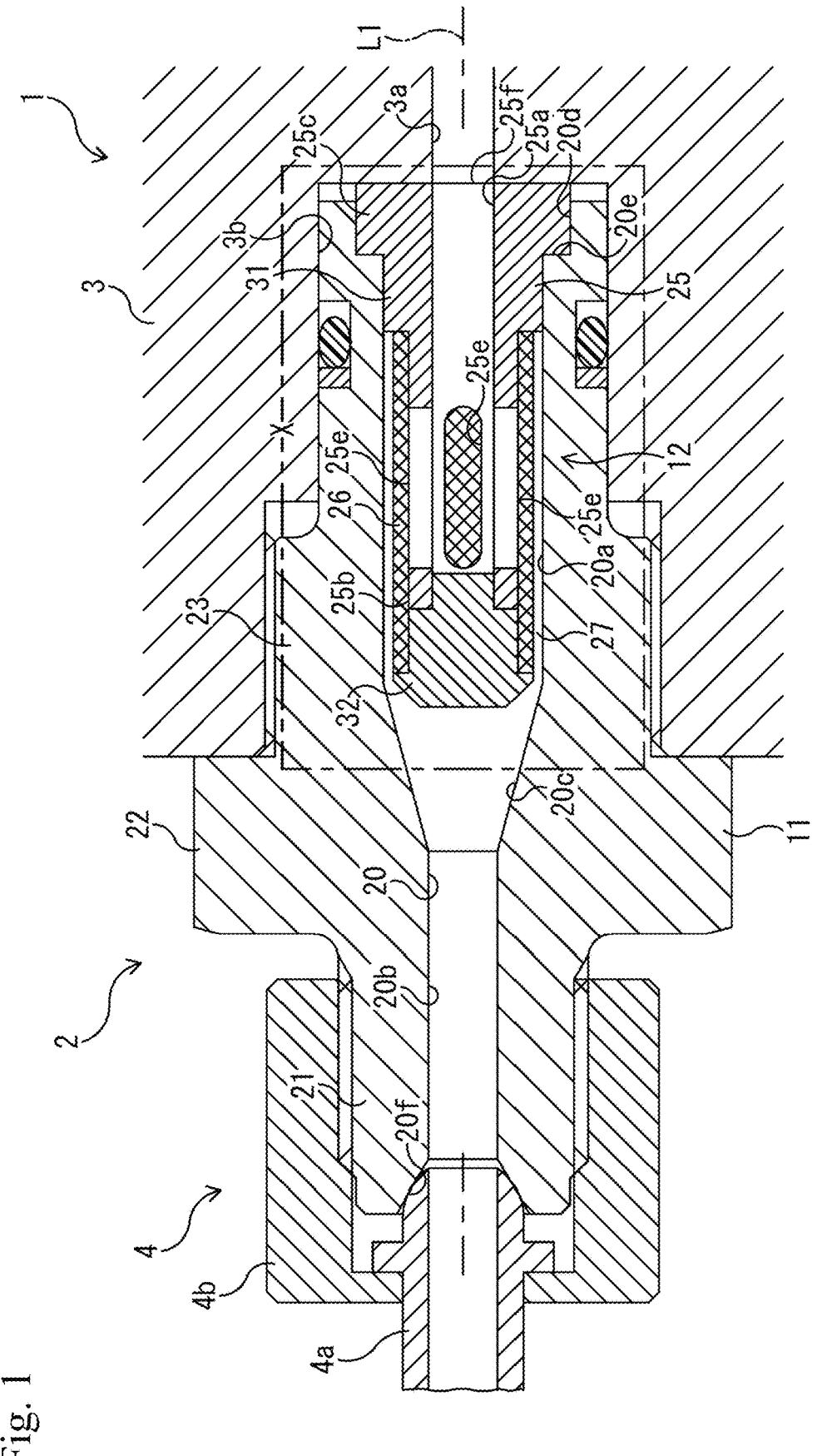
FIG. 1 is a cross-sectional view of a piping plug of the present invention.

The piping plug 2 of the present embodiment shown in FIG. 1 is a plug for attaching piping 4 through which fluid flows, to the valve block 3. The piping plug 2 includes a housing 11 and a filter device 12. The piping plug 2 is inserted into the attachment hole 3b. Thus, the piping plug 2 is attached to the valve block 3. Also, to the piping plug 2, the piping 4 is attached. And, the piping 4 is configured as follows. It is to be noted that the piping 4 described below is merely one example. Therefore, the piping 4 is not limited to that described below.

The piping 4 has a piping body 4a and a cap nut 4b. The piping body 4a allows gas to flow therethrough. The piping body 4a connects a distal end part thereof to the piping plug 2. More specifically, the distal end part of the piping body 4a is formed into a partially spherical shape. The piping body 4a is connected to the piping plug 2 such that the distal end side part comes into contact with the piping plug 2 (more specifically, be seated on a later-described piping seat 20f). The cap nut 4b is externally attached to the distal end side part of the piping body 4a, and does not come out of the distal end of the piping body 4a. And, the cap nut 4b is screwed with the piping plug 2 in the condition tat the distal end side part of the piping body 4a is in contact with the piping plug 2. Thus, the piping 4 is attached to the piping plug 2.

Housing

To the housing 11, the piping 4 can be connected as shown in FIG. 1. The housing 11 includes a through-hole 20 as shown in FIG. 2, and the through-hole 20 accommodates the filter device 12. More specifically, the housing 11 is cylindrical. And, an inner hole of the housing 11 forms the through-hole 20. Also, one end side part in the axial direction of the housing 11 is inserted into the attachment hole 3b. More specifically, one end side part in the axial direction of the housing 11 is screwed with the attachment hole 3b. As a result, the opening on the one side in the axial direction of the through-hole 20 faces the passage 3a. It is to be noted that the axial direction is the direction in which the axial line of the housing 11 extends. In the present embodiment, the axial line of the housing 11 and the axial line L1 described above coincide. That is, the axial direction is synonymous with the direction in which the axial line L1 extends.

Also, the through-hole 20 includes a large-diameter part 20a and a small-diameter part 20b. More specifically, the through-hole 20 includes a taper part 20c, a press-fit part 20d, and a step part 20e in addition to the large-diameter part 20a and the small-diameter part 20b. The large-diameter part 20a is located on one side in the axial direction in the through-hole 20. The small-diameter part 20b is located on the other end side in the axial direction in the through-hole 20. And, the small-diameter part 20b has a hole diameter that is smaller than a hole diameter of the large-diameter part 20a. Also, the small-diameter part 20b has the piping seat 20f in the present embodiment. The piping seat 20f is located in the other end part in the axial direction, namely in the open end part of the small-diameter part 20b. On the piping seat 20f, a distal end part of the piping body 4a is seated as described above. In the present embodiment, the piping seat 20f is formed to decrease in diameter from the open end toward one side in the axial direction.

The taper part 20c is located between the small-diameter part 20b and the large-diameter part 20a. The taper part 20c increases in diameter from the small-diameter part 20b toward the large-diameter part 20a, namely, has a tapered shape. The press-fit part 20d is located on one side in the axial direction than the large-diameter part 20a in the through-hole 20. The press-fit part 20d has a hole diameter that is larger than a hole diameter of the large-diameter part 20a. As a result, a part between the large-diameter part 20a and the press-fit part 20d is formed into a step, and the part formed into a step constitutes the step part 20e.

The housing 11 has a piping connection part 21, a seating part 22, and a block attachment part 23. The piping connection part 21 is located on the other side in the axial direction in the housing 11. The piping connection part 21 is capable of connecting the piping 4. More specifically, an external thread is formed on the outer circumferential face of the piping connection part 21. The piping connection part 21 is screwed with the cap nut 4b of the piping 4. Thus, the piping 4 is connected to the piping connection part 21. Also, the small-diameter part 20b of the through-hole 20 is located in the piping connection part 21.

The seating part 22 is located in an intermediate part in the axial direction in the housing 11. More specifically, the seating part 22 is located between the piping connection part 21 and the block attachment part 23. Also, the outer diameter of the seating part 22 is larger than the diameter of the attachment hole 3b of the valve block 3. And, the seating part 22 comes into contact with the valve block 3 when the housing 11 is attached to the valve block 3. Further, the outer diameter of the seating part 22 is larger than the diameter of the piping connection part 21. Thus, the strength of the housing 11 is ensured. Also, to the seating part 22, the small-diameter part 20b extends from the piping connection part 21. Further, in the seating part 22, the taper part 20c is located.

The block attachment part 23 which is one example of a casing attachment part, is located on one side in the axial direction in the housing 11. And, the block attachment part 23 is attached to the valve block 3. More specifically, the block attachment part 23 is inserted into the attachment hole 3b. And, the block attachment part 23 in a sealed state is screwed with the attachment hole 3b. Also, the block attachment part 23 is formed to have a larger diameter than the piping connection part 21. Further, in the block attachment part 23, the taper part 20c extends from the seating part 22. Further, in the block attachment part 23, the large-diameter part 20a is located.

Filter Device

Figure 3:
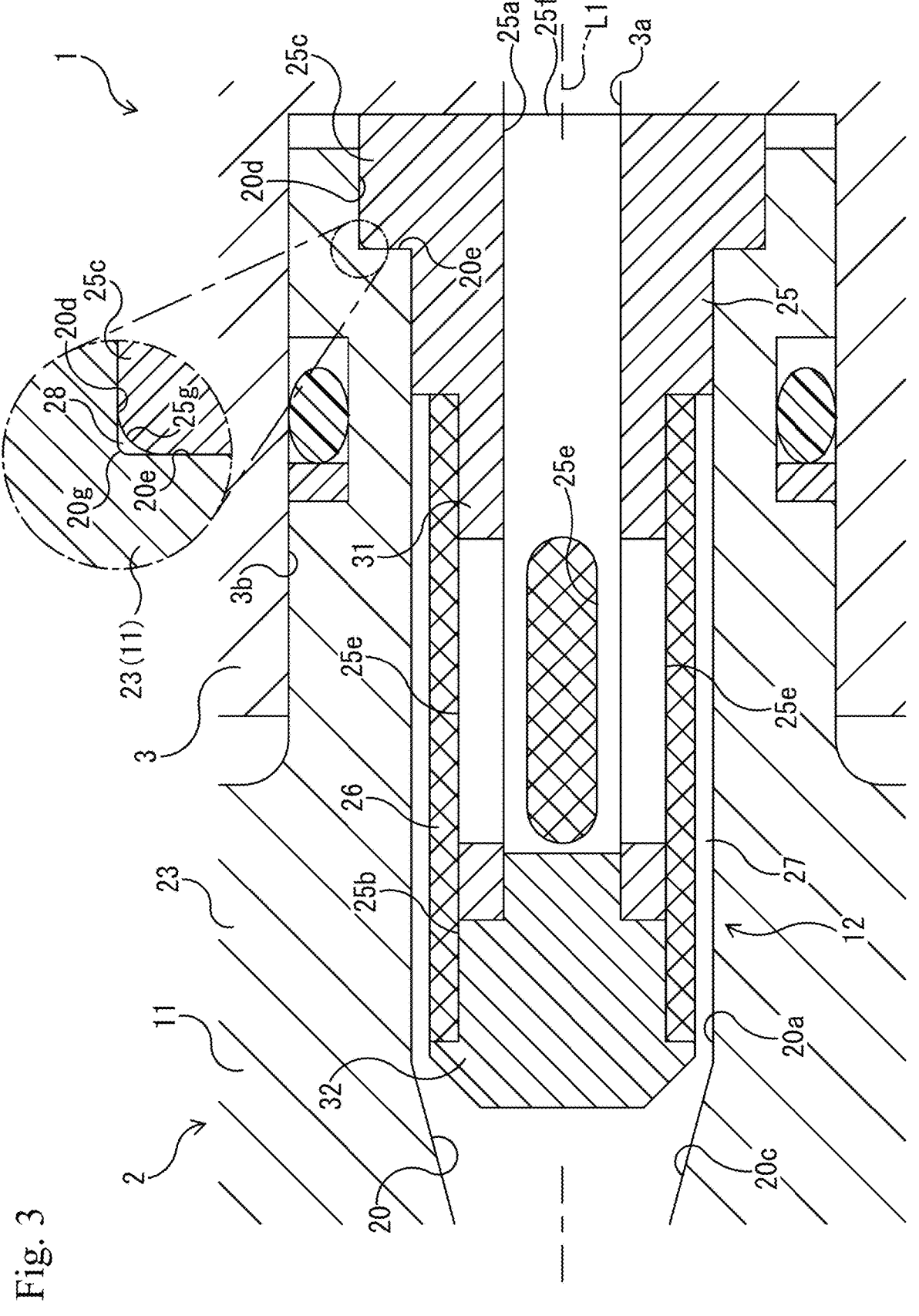
FIG. 3 is an enlarged cross-sectional view showing a region X of the piping plug of FIG. 1.

The filter device 12 is inserted into the through-hole 20 and provided in the housing 11 as shown in FIG. 3. More specifically, the filter device 12 is located in the large-diameter part 20a of the through-hole 20. And, the filter device 12 is cantilever-supported by the housing 11 in one end side part in the axial direction. As a result, the filter device 12 is inserted into the through-hole 20 such that a clearance is left with the inner circumferential face of the housing 11. The filter device 12 includes a holder 25 and a filter 26.

The holder 25 includes a holder passage 25a. More specifically, the holder 25 includes a filter attachment groove 25b and a flange 25c. The holder 25 is inserted into the through-hole 20. And, the holder 25 is cantilever-supported by the housing 11 in one end side part in the axial direction. More specifically, the holder 25 is disposed such that a clearance is left around the outer circumferential face of the holder 25, and one end side part in the axial direction is supported by the housing 11. As a result, the holder 25 is cantilever-supported by the housing 11 in the one end side part in the axial direction. And, by leaving a clearance around the outer circumferential face on the other side in the axial direction of the holder 25, an annular flow channel 27 is formed between the outer circumferential face of the holder 25 and the inner circumferential face of the housing 11.

The holder passage 25a penetrates the holder 25 in the axial direction. More specifically, the holder 25 is formed into a topped cylinder. And, the inner hole of the holder 25 forms the holder passage 25a. The holder passage 25a has a first opening 25e and a second opening 25f. The first opening 25e is located on the outer circumferential face of the holder 25. More specifically, a plurality of first openings 25e are formed on the outer circumferential face of the holder 25 at intervals in the circumferential direction. In the present embodiment, four first openings 25e are formed in the intermediate part in the axial direction on the outer circumferential face of the holder 25. The second opening 25f is located at one end in the axial direction (namely, bottom surface) of the holder 25.

The filter attachment groove 25b is formed on the outer circumferential face of the holder 25. The filter attachment groove 25b is located to correspond to the plurality of first openings 25e. In the present embodiment, the filter attachment groove 25b is formed over the entire circumference in the circumferential direction in the outer circumferential face of the holder 25. Also, the filter attachment groove 25b is formed to straddle the first openings 25e in the axial direction.

The flange 25c is located in one end side part in the axial direction of the holder 25. The flange 25c is formed over the entire circumference in the circumferential direction in the outer circumferential face of the holder 25, and protrudes outward in the radial direction in the outer circumferential face of the holder 25. And, the flange 25c is press-fit into the press-fit part 20d. Accordingly, the holder 25 is supported by the housing 11 with the flange 25c (that is, one end side part in the axial direction). On the other hand, the holder 25 leaves a clearance with the inner circumferential face of the housing 11 at least on the other side in the axial direction than the flange 25c and the first openings 25e. Therefore, the holder 25 is cantilever-supported by the housing 11 with the flange 25c. And, around the holder 25, the annular flow channel 27 is formed. Also, the flange 25c is press-fit into the through-hole 20 (more specifically, press-fit part 20d) such that it comes into contact with the step part 20e.

Also, the flange 25c has a corner part 25g as shown in the enlarged view of FIG. 3. The corner part 25g faces the step part 20e. And, the corner part 25g forms a capture space 28 between the corner part 25g and the housing 11. More specifically, the housing 11 has a nook portion 20g in the step part 20e. The nook portion 20g faces the corner part 25g. Both the nook portion 20g and the corner part 25g are R chamfered. And, the diameter of the R chamfering of the corner part 25g is larger than the diameter of the R-chamfering of the nook portion 20g. Thus, the capture space 28 is formed between the nook portion 20g and the corner part 25g, and the housing 11 has the capture space 28.

To describe in more detail the configuration of the holder 25, the holder 25 includes a holder body 31 and a cap 32.

The holder body 31 is formed into a cylindrical shape. And, the inner hole of the holder body 31 includes the holder passage 25a. On the outer circumferential face of the holder body 31, the plurality of first openings 25e are formed, and the opening at one end of the holder passage 25a of the holder body 31 forms the second opening 25f. The holder body 31 has the flange 25c in one end side part. The cap 32 is formed into a cylindrical shape. One end side part of the cap 32 is inserted into the other end side of the inner hole of the holder body 31. By insertion of the cap 32, the other end side of the inner hole of the cylindrical holder body 31 is blocked, and the holder 25 is configured to be a topped cylinder. Also, in the outer circumferential face of the configured holder 25, the filter attachment groove 25b is formed from the holder body 31 to the cap 32.

The filter 26 captures contaminations and the like flowing together with the gas passing therethrough. The filter 26 is provided in the holder 25 to cover the four first openings 25e. The filter 26 is formed, for example, into a cylindrical shape. The filter 26 is externally attached on the intermediate part in the axial direction of the holder 25. In the present embodiment, the filter 26 is externally fit on the other end side in the axial direction of the holder body 31. Further, the cap 32 is inserted into the inner hole of the holder body 31. Accordingly, the filter 26 fits into the filter attachment groove 25b of the holder 25 (namely, externally attached to the intermediate part in the axial direction of the holder 25), and is sandwiched between the cap 32 and the holder body 31. Thus, all the four first openings 25e are covered with the filter 26. The filter 26 disposed in this manner intervenes in the through-hole 20 and captures contaminations and the like flowing through the through-hole 20 together with the gas.

Gas Flow in Piping Plug

Figure 4:
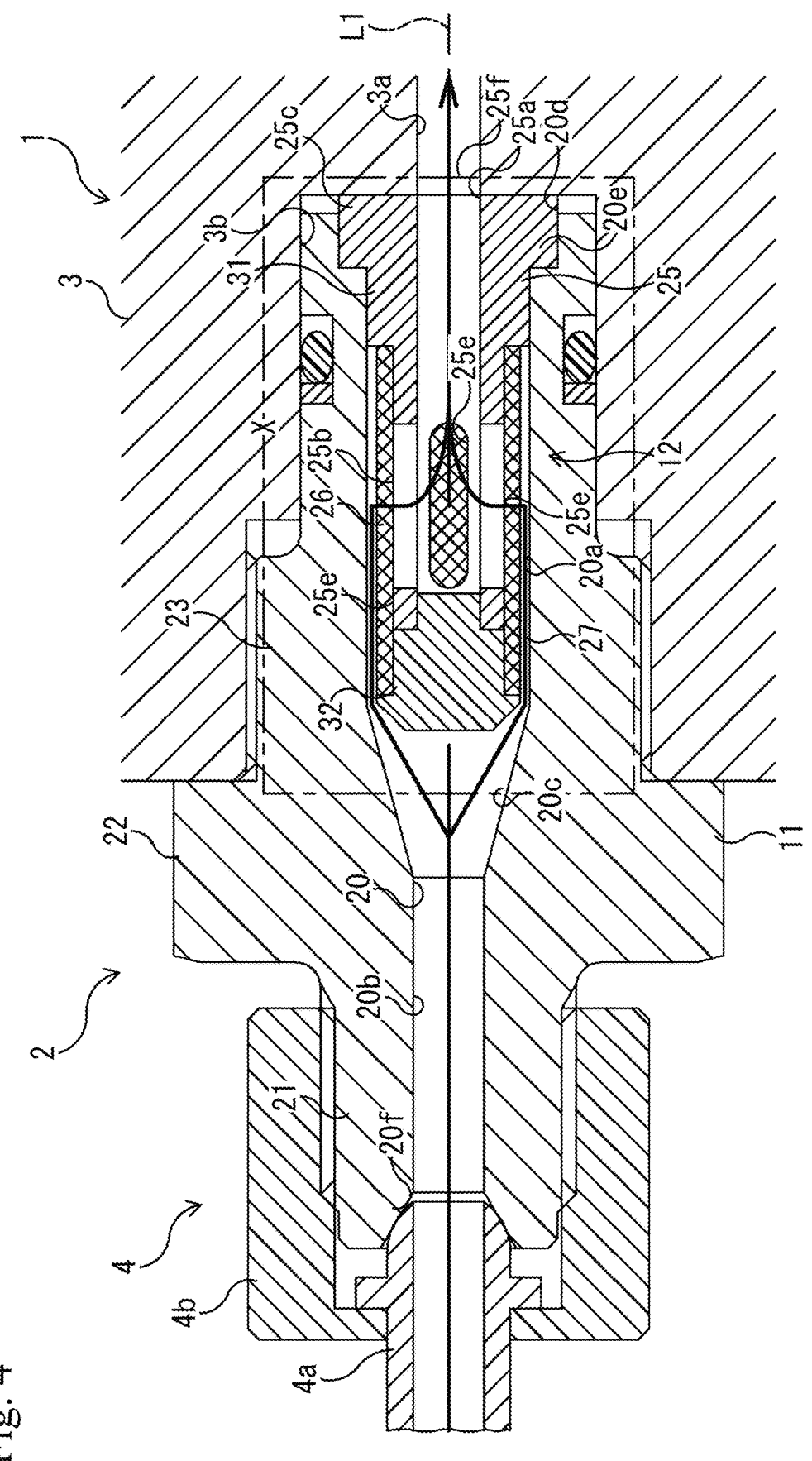
FIG. 4 is a cross-sectional view showing the flow of gas in the piping plug of FIG. 1.

In the piping plug 2, as indicated by the bold line in FIG. 4, the gas can be flown to the passage 3a from the piping 4 via the piping plug 2. More specifically, the gas introduced from the piping 4 into the piping plug 2 first passes through the small-diameter part 20b. Thereafter, the gas is guided to the large-diameter part 20a through the taper part 20c. Thus, the gas flows along the inner circumferential faces of the taper part 20c and the large-diameter part 20a. Thus, the gas can be guided to the flow channel 27 located around the holder 25. Also, the gas flows from the flow channel 27 into the holder passage 25a through the plurality of first openings 25e. At this time, the contaminations and the like flowing together with the gas are captured by the filter 26. Also, in the filter device 12, since the plurality of first openings 25e are formed at intervals in the circumferential direction in the holder 25, the gas can be evenly guided from the annular flow channel 27 to the holder passage 25a via the plurality of first openings 25e. Therefore, it is possible to use the entire filter 26 efficiently so as to capture contaminations and the like. The gas after capturing is delivered to the passage 3a from the holder passage 25a through the second opening 25f.

Also, in the piping plug 2, the gas can be flown also to the piping 4 from the passage 3a via the piping plug 2. At this time, the gas flows in the direction opposite to the flow described above. That is, the gas flows from the passage 3a to the holder passage 25a through the second opening 25f. Thereafter, the gas flows out from the plurality of first openings 25e to the flow channel 27 through the filter 26. The gas flown out to the flow channel 27 flows toward the taper part 20c along the inner circumferential face of the housing 11 around the holder 25. After being narrowed down in the taper part 20c, the gas is delivered into the piping 4 through the small-diameter part 20b.

According to the piping plug 2 of the present embodiment, the clearance around the outer circumferential face of the holder 25, namely, the flow channel 27 connects to the holder passage 25a via the filter 26 and the first openings 25e. Therefore, it is possible to make the filter 26 intervene in the through-hole 20. Also, since the holder 25 is cantilever-supported by the housing 11 with the flange 25c which is one end side part, it is possible to make the flow channel 27 annular. Accordingly, it is possible to increase the flow passage area of the flow channel 27 compared with the case where the holder 25 is supported on both ends, and hence, it is possible to reduce the pressure loss of the gas flowing through the through-hole 20.

Also, according to the piping plug 2 of the present embodiment, since the filter device 12 is inserted into the large-diameter part 20a having a larger hole diameter, it is possible to increase the flow passage area of the flow channel 27 compared with the case where the filter device 12 is inserted into the small-diameter part 20b. As a result, it is possible to further reduce the pressure loss of the gas flowing through the through-hole 20.

Also, according to the piping plug 2 of the present embodiment, since the large-diameter part 20a is located in the block attachment part 23 having a larger outer diameter than the piping connection part 21, it is possible to ensure the strength of the housing 11.

Also, according to the piping plug 2 of the present embodiment, since the gas flows from the small-diameter part 20b to the large-diameter part 20a through the taper part 20c, the gas flows along the inner circumferential face of the taper part 20c, and the inner circumferential face of the large-diameter part 20a. Therefore, it is possible to reduce the pressure loss generated by the gas flowing through the through-hole 20 coming into contact with the holder 25.

Also, according to the piping plug 2 of the present embodiment, since the plurality of first openings 25e are formed at intervals on the outer circumferential face of the topped cylindrical holder 25, the part between neighboring first openings 25e functions as a reinforcing member in the holder 25. Therefore, the filter device 12 has high strength against loading. Therefore, it is possible to suppress the filter device 12 from being crushed by the gas.

Further, according to the piping plug 2 of the present embodiment, since the plurality of first openings 25e are formed at intervals on the outer circumferential face of the holder 25, it is possible to ensure the flow passage area of the gas flowing from the annular flow channel 27 to the holder passage 25a. As a result, it is possible to reduce the pressure loss of the gas flowing through the through-hole 20. Also, since the filter 26 is provided over the entire circumference of the outer circumferential face of the holder 25 so as to cover the plurality of first openings 25e, the gas flows uniformly in the annular flow channel 27, and hence the entire filter 26 can be used efficiently. That is, it is possible to enhance the filtration efficiency of the filter device 12.

Also, according to the piping plug 2 of the present embodiment, contamination occurs due to press-fitting, however, the flange 25c of the holder 25 is brought into contact with the step part 20e. Therefore, when the contaminations generated by the press-fitting are about to pass between the flange 25c and the step part 20e together with the gas, they are dammed by the flange 25c and the step part 20e. As a result, it is possible to prevent the contaminations from flowing into the flow channel 27.

Also, according to the piping plug 2 of the present embodiment, the contaminations that are generated at the time of press-fitting and dammed by the flange 25c and the step part 20e can be stored by the capture space 28. As a result, it is possible to prevent the contaminations from being swept into the flow channel 27.

Furthermore, according to the tank valve device 1 of the present embodiment, it is possible to provide the tank valve device 1 having the function as described above.

Other Embodiments

While the piping plug 2 of the present embodiment is attached to the valve block 3, the casing to which the piping plug 2 is attached is not limited to the valve block 3. It may be a casing to which the piping 4 is to be connected.

Also, in the piping plug 2 of the present embodiment, the through-hole 20 of the housing 11 does not necessarily have the taper part 20c. Also, the small-diameter part 20b and the large-diameter part 20a are not necessarily required in the through-hole 20 of the housing 11. That is, the through-hole 20 may have the constant diameter in the axial direction. Also, in the piping plug 2 of the present embodiment, the holder 25 is press-fit into the through-hole 20 of the housing 11, the holder 25 may be attached to the through-hole 20 by other method such as screwing.

Further, in the piping plug 2 of the present embodiment, the piping body 4a is interference fit with the piping connection part 21 by means of the cap nut 4b, and thus the piping 4 is connected with the piping connection part 21, however, the piping 4 may be connected with the piping connection part 21 by other connecting method.

Various modifications and other embodiments of the present invention will be apparent to those skilled in the art from the above description. Therefore, the above description should be interpreted merely as illustration, and is provided for the purpose of indicating the best mode for carrying out the present invention to those skilled in the art. The details of the structure and/or the function can be substantially changed without departing from the spirit of the present invention.

The invention claimed is:

1. A piping plug comprising:
a housing including a through-hole; and
a filter device that is inserted into the through-hole, and provided in the housing, wherein
the filter device includes a holder including a holder passage having a first opening and a second opening, and a filter provided in the holder so as to cover the first opening,
the first opening is located on an outer circumferential face of the holder,
the second opening is located at one end of the holder,
the holder is cantilever-supported by the housing in one end side part of the holder such that a clearance is left around the outer circumferential face,
the through-hole has a step part, and
the one end side part of the holder fits into the through-hole of the housing so as to be brought into contact with the step part, the one end side part being cantilever-supported by the housing.

2. The piping plug according to claim 1, wherein
the through-hole includes a large-diameter part and a small-diameter part having a hole diameter smaller than a hole diameter of the large-diameter part, and
the filter device is located in the large-diameter part.

3. The piping plug according to claim 2, wherein
the housing includes a piping connection part to which a
   piping is connected, and a casing attachment part
   having an outer diameter larger than an outer diameter
   of the piping connection part and attached to the casing,
the small-diameter part is located in the piping connection
   part, and
the large-diameter part is located in the casing attachment
   part.

4. The piping plug according to claim 2, wherein
the through-hole includes a taper part between the small-
   diameter part and the large-diameter part, and
the taper part has a diameter increasing from the small-
   diameter part toward the large-diameter part.

5. The piping plug according to claim 1, wherein
the holder is formed into a topped cylinder,
the first opening is formed plurally at intervals in the
   circumferential direction on the outer circumferential
   face of the holder, and
the filter is provided in the holder so as to cover the
   plurality of first openings.

6. The piping plug according to claim 1, wherein the
housing has a capture space formed between a nook portion
of the step part and a corner part facing the step part in one
end side part of the holder.

7. A tank valve device comprising:
a casing provided in a tank, and
the piping plug according to claim 1,
the piping plug being attached to the casing.

8. A tank valve device comprising:
a casing provided in a tank, and
a piping plug attached to the casing, wherein
the casing includes an attachment hole,
the piping plug includes:
   a housing including a through-hole; and
   a filter device including a holder including a holder
      passage having a first opening and a second opening,
      and a filter provided in the holder so as to cover the
      first opening, the filter device being inserted into the
      through-hole and provided in the housing,
the first opening is located on an outer circumferential
   face of the holder,
the second opening is located at one end of the holder,
the holder is cantilever-supported by the housing in one
   end side part of the holder such that a clearance is left
   around the outer circumferential face, and
the filter device is located in the attachment hole of the
   casing.

* * * * *